United States Patent [19]

Abrams et al.

[11] 4,416,855

[45] Nov. 22, 1983

[54] RADIOACTIVE WASTE TREATMENT APPARATUS

[75] Inventors: Richard F. Abrams, Westboro, Mass.; James G. Chellis, Centerport, N.Y.

[73] Assignee: Koch Process Systems, Inc., Westborough, Mass.

[21] Appl. No.: 232,821

[22] Filed: Feb. 9, 1981

[51] Int. Cl.³ .................... B01D 53/34; B01J 19/24; G21F 9/00

[52] U.S. Cl. .................... 422/111; 110/215; 110/237; 422/159; 422/172

[58] Field of Search ............ 422/159, 170, 172, 62, 422/111; 110/215–217, 232; 55/229

[56] References Cited

U.S. PATENT DOCUMENTS

| | | | |
|---|---|---|---|
| 3,464,375 | 9/1969 | Tarbox | 110/7 |
| 3,476,062 | 11/1969 | Ramires | 110/8 |
| 3,572,264 | 3/1971 | Mercer | 110/8 |
| 3,601,070 | 8/1971 | Lambiris | 110/10 |
| 3,741,133 | 6/1973 | Kleinfelter | 110/8 |
| 3,812,793 | 5/1974 | Solomon | 110/8 |
| 3,848,548 | 11/1974 | Bolejack, Jr. et al. | 110/7 |
| 3,922,974 | 12/1975 | Hempelmann | 110/8 |
| 3,925,039 | 12/1975 | Ziegler | 55/223 |
| 3,989,465 | 11/1976 | Onnen | 422/110 |
| 4,019,896 | 4/1977 | Appleby | 75/44 |
| 4,036,593 | 7/1977 | Satoh | 422/172 X |
| 4,098,200 | 7/1978 | Dauvergne | 110/204 |
| 4,155,977 | 5/1979 | Baker | 422/62 |
| 4,223,614 | 9/1980 | Barkuus et al. | 110/215 X |

OTHER PUBLICATIONS

"Radioactive Waste Incineration Studies at the Los Alamos Scientific Laboratory" by Stretz et al., submitted to *American Nuclear Society Annual Mtg*–Jun. 9–13, 1980.

"Controlled-Air Incineration of Transuranic-Contaminated Solid Waste" by L. C. Borduin, et al., presented to the 14th *ERDA Air Cleaning Conference*–Aug. 2–4, 1976.

"Operation of a Prototype High-Level Alpha Solid Waste Incinerator by H. E. Hootman et al., Savannah River Lab-E.I. Du Pont de Nemours & Co. Presented at *American Nuclear Society* 1979 Winter Mtg on 11/16/79.

"Volume Reduction of Liquid & Solid Radioactive Wastes Using a Fluidized Bed Calciner/Incinerator" by J. R. May (*Newport News Industrial Corp.*) Oct. 3–7, 1978.

"Incineration" pp. 83–112 *Recommended Methods of Reduction, Neutralization, Recovery, or Disposal of Hazardous Waste, vol. III, Disposal Process Descriptions, Ultimate Disposal, Incineration and Pyrolysis Processes* by TRW Systems Group–Aug. 1973.

*Primary Examiner*—Bradley Garris
*Attorney, Agent, or Firm*—Hamilton, Brook, Smith and Reynolds

[57] ABSTRACT

Radioactive waste treatment apparatus in which the waste is burned in a controlled combustion process, the ash residue from the combustion process is removed and buried, the gaseous effluent is treated in a scrubbing solution the pH of which is maintained constant by adding an alkaline compound to the solution while concurrently extracting a portion of the scrubbing solution, called the blowdown stream. The blowdown stream is fed to the incinerator where it is evaporated and the combustibles in the blowdown stream burned and the gaseous residue sent to the scrubbing solution. Gases left after the scrubbing process are treated to remove iodides and are filtered and passed into the atmosphere.

4 Claims, 1 Drawing Figure

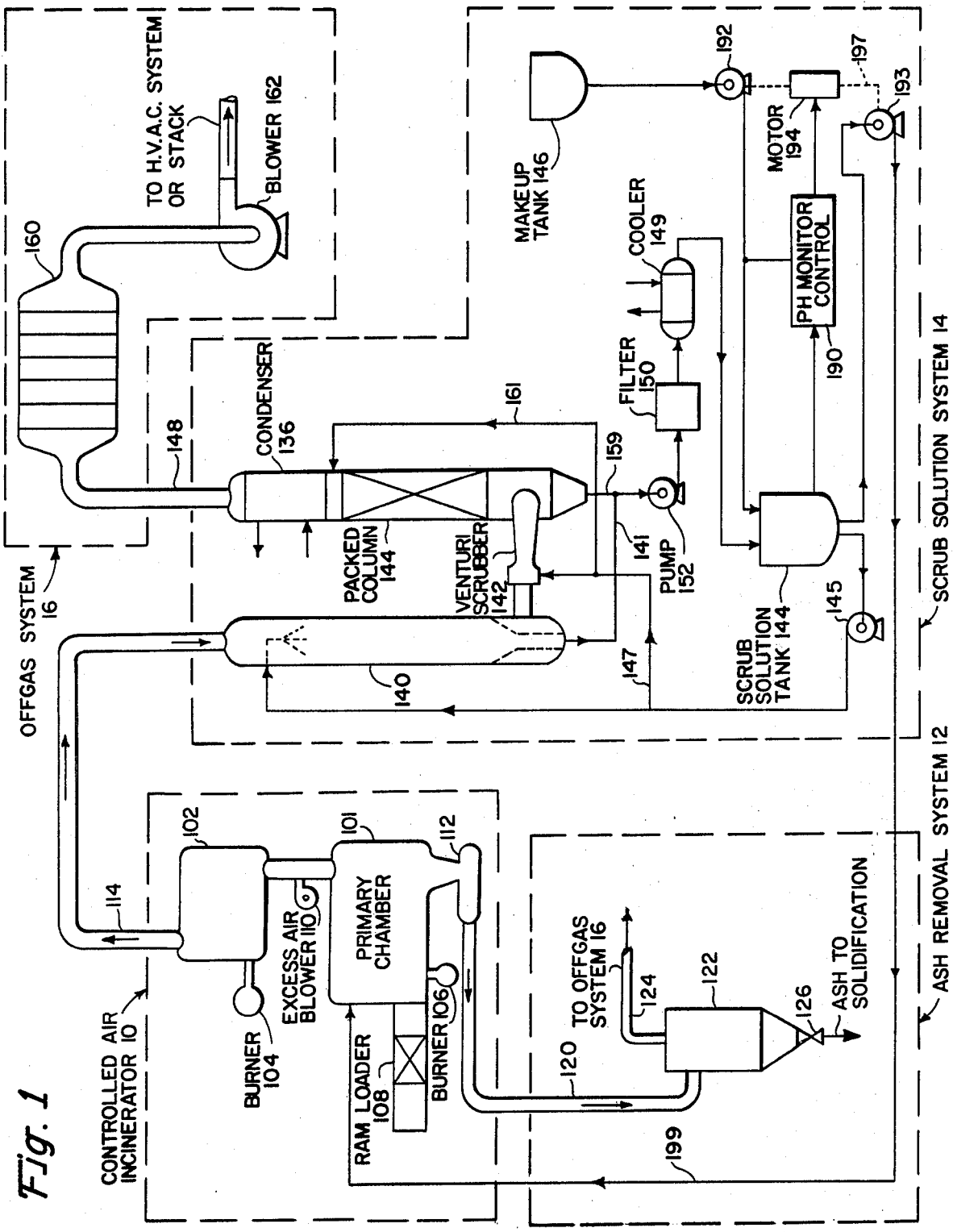

RADIOACTIVE WASTE TREATMENT APPARATUS

DESCRIPTION

1. Technical Field

This invention relates to solid waste disposal systems and in particular to radioactive waste treatment.

2. Background Art

One of the main problems associated with the use of nuclear fission processes is the lack of economic, pollution-free apparatus for disposing of combustible radioactive waste by-products of the processes. One solution to this problem has been to incinerate the combustible waste in a gas fired incinerator. A typical system is described in U.S. Pat. No. 3,464,375 "Incinerator with Fluid Turbulator" to Tarbox (hereinafter the Tarbox incinerator system). In the Tarbox incinerator system, solid combustible radioactive waste is burned in a two chamber incinerator. Combustion gases are fed to a cyclone separator where coarse entrained particulates are removed and collected in a drum for further disposal. Effluent from the separator is fed to an electrostatic precipitator for removal of fine particles entrained in the combustion gases. These fine particulates are also collected in a drum for disposal. Lastly, the remaining combustion gases are filtered and exhausted out a gas stack.

While the Tarbox incinerator system greatly reduces the volume of combustible radioactive waste, it still leaves a considerable volume remaining in the residue from the precipitator and separator. Furthermore, the Tarbox incinerator system provides no way of removing noxious gases which should not be vented into the atmosphere.

One method of entrapping noxious gases is described in U.S. Pat. No. 3,848,548 "Incineration Process for Disposal of Waste Propellant and Explosives" to Bolejack, Jr. et al. (hereinafter the Bolejack process). In the Bolejack process, an aqueous suspension of waste explosives and water are burned in a rotary incinerator (or kiln) whereby the waste is sequentially evaporated, the particulate explosive is burned and the combustion gases passed through a scrubber before being vented to the atmosphere. The scrubber employs a scrubbing liquid such as a water spray to reduce particulate matter and water soluble gases in the exhaust stream. No provision is made for removal or treatment of the waste stream from the scrubber (sometimes called the blowndown stream) which, in the case of radioactive waste, can remain a substantial problem. The stream is a mixture of solvents and radioactive particulates. One solution to the problem of disposal of this stream would be to transport it to a separate liquid radioactive waste (radwaste) system where it is treated, for example, in a fluidized calciner/evaporator such as the calciner/evaporator described in the Transactions of the American Nuclear Society, Suppl., 32, 1, 44–45 "Fluidized Bed Dryer/Incinerator for Radwaste Volume Reduction" Keith, R. A. and Garcia, R. However, this is a complex and costly solution which would make the entire radioactive waste incinerator process less attractive.

The problem of disposal of the blowdown stream is further complicated by the requirement that polyvinylchloride vinylchloride (PVC) material, such as protective plastic gloves, slippers and bags commonly used in nuclear plants make up a substantial portion of the radioactive waste being incinerated. When PVC is incinerated, corrosive and noxious hydrogen chloride (HCL) gas is formed during combustion. In order to eliminate this gas from the incinerator effluent stream, an alkaline scrub solution, such as sodium hydroxide (NaOH), is employed as the scrubbing liquid. In this manner, the HCL is neutralized forming sodium chloride (NaCL) and water. This formation causes the pH (Hydrogen ion concentration) of the scrub solution to drop, i.e., the solution becomes more acidic. As this happens, it becomes necessary to add more sodium hydroxide (called "the make-up product") to the scrub solution to further neutralize the acid solution. As a result, the overall liquid volume in the scrub solution tank increases and the overflow must be discharged. This overflow forms what is called the "blowdown" stream.

A need therefore exists for a simple, reliable, and inexpensive process and apparatus for disposal of this blowdown stream in a radioactive waste incinerator process. A further need exists to simplify and automate the process of adding the make-up product to the scrub solution while simultaneously disposing of the blowdown stream.

DISCLOSURE OF THE INVENTION

A radioactive waste incinerator is utilized in which radioactive waste is burned in a unit such as a controlled air incinerator (CAI) having a primary combustion chamber and an excess air afterburner chamber. Combustion gases are treated by a scrub solution system to cool the hot gases, remove entrained particulates, neutralize acid gases and absorb radionuclides.

After treatment in the scrub solution system, the remaining gaseous combustion products are treated in a "dry offgas" system where residual particulates and trace iodine is removed, and then the clean gas discharged into the atmosphere or further treated in a heating, ventilation and air conditioning (HVAC) system.

The scrub solution system includes apparatus for maintaining the correct pH of the scrubbing solution while extracting excess scrub solution (blowdown stream), which is circulated back to the input of the incinerator where it is evaporated to dryness and discharged along with the ash from the solid radioactive waste. This totally eliminates the problems of disposing of the radioactive blowdown stream from the scrub solution system.

BRIEF DESCRIPTION OF THE DRAWINGS

FIG. 1 is a schematic diagram of the radioactive waste incinerator apparatus of the invention.

BEST MODE OF CARRYING OUT THE INVENTION

As can be seen in the embodiment of FIG. 1, the incinerator system is comprised of four subsystems (shown in dotted lines), a controlled air incinerator (CAI) 10, an ash removal system 12, a gas scrubbing system 14, and an "offgas" system 16. The controlled air incinerator 10 is a commercially available waste incinerator, such as the type manufactured by the Comtro Division of Sunbeam Equipment Corporation, which has been modified to handle radioactive waste. The incinerator has a primary combustion chamber 101 followed by an excess air afterburner chamber 102. Both chambers have a carbon steel outer shell and are internally coated with mastic material for acid-gas corrosion protection. A two inch layer of mineral block insulation is provided over the mastic and a four inch high density castable refractory liner covers the mineral block.

Burners 106 and 104 maintain proper operating temperatures within respective primary and secondary combustion chambers. The burners may use either propane, natural gas, or fuel oil. Once proper operating temperatures of about 1500° F. and 1800° F. in the primary and secondary chambers, respectively, are established, burner 106 may be turned off provided the proper temperature in the primary chamber is maintained. Fuel is required then only for afterburner 104. Air is provided for the primary chamber by a blower (not shown). The air is controlled such that combustion occurs at a greater than stoichiometric mixture to avoid pyrolysis. Excess air for the afterburner is provided by a separate blower 110.

A hydraulic ram feeder 108 is provided to load solids into the primary chamber. Space is provided between the ram feed and the incinerator for a shield wall which will minimize operator exposure during the loading operation. The feeder can handle batches up to 1 cubic yard in volume. Other than removal of large noncombustible objects, feed pretreatment, such as shredding, is not required. Small noncombustibles, such as nuts and bolts, will not interfere with system operation. As will be described in detail, the proper selection of materials of construction and scrubbing processes allows high levels of PVC material to be burned which eliminates the need to segregate feed constituents.

Ash formed from the combustion of wastes is pushed along the hearth in the primary chamber by incoming feed and eventually (after sufficient residence time to assure total combustion) falls into an ash pit 112 located at the end of the hearth.

The incinerator effluent from the afterburner chamber 102 flows into the gas scrubbing system 14 through a refractory lined pipe 114. The high temperature gases are cooled in a quench column 140 by multiple scrub solution sprays supplied by pump 145 from scrub solution tank 144. The quench column cools the combustion gases by direct evaporation of recycled scrubbing solution from scrub solution tank 144. Excess solution in the quench column is recycled via conduit 141 to pump 152 where it is pumped to scrub solution tank 144 after being filtered in filter 150 to remove particulates and cooled in cooler 149.

The saturated gas in column 140 then enters a high energy venturi scrubber 142 where any remaining particulates are removed.

The venturi scrubber is located between the quench column 140 and packed column and consists of converging and diverging cones with a clamp valve throat which allows the venturi pressure drop to be held constant during periods of varying flow. Scrub solution enters the venturi from conduit 147 through a nozzle (not shown) upstream of the throat. Mineral acids are removed from the gas by concurrent contact with the recycled scrub solution. Any acid gases which may still be present are neutralized by caustic in a counterflow packed column 144.

The packed column 144 is supplied at the top of the column with recycled scrub solution by pump 145 via conduits 147 and 161. Counter-current contact with the scrub solution reduces the gas-phase HCL to an acceptable, very small level. The scrub solution at the bottom of the packed column is recycled through pump 152, filter 150, cooler 149 to scrub solution tank 144. A water cooled condenser 136 is located at the top of the packed column which condenses water vapor and cools the gas to 130° F.

Gas from the condenser 136 is fed to a "dry offgas" system 16 through pipe 148.

The offgas system is provided in a module 160 which contains a mist eliminator, reheater, primary high efficiency particulate air (HEPA) filter, iodine adsorption section and redundant HEPA filter. This is a well known module in standard use in the industry.

The motive force of the gas flow in the system is provided by a blower 162 which follows the offgas module 160. By locating the blower at the discharge of the system, the entire incinerator system is under negative pressure thus insuring that leakage, should any occur, would be into the system.

The ash removal system 12 comprises a closed pneumatic conveyor 120 in which the ash is transferred to an ash hopper 122 that can be located a distance away from the ash pit 112. The ash is emptied from the hopper through double sliding valves into an ash receptical such as a cask liner. Motive air passes through a cyclone separator and a sintered metal "blowback" filter to remove all traces of ash. The air then enters the offgas system 16 via conduit 124 for iodine removal and HEPA filtration.

A grate located in the ash pit 126 will catch any large noncombustibles to prevent them from interfering with the ash transfer system. These non-combustibles can then be manually removed from the grate through a local access door during shutdown.

In addition to the scrub solution pump 145 and scrub solution tank 144 previously mentioned, the gas scrubbing system 14 also includes "make-up" tank 146 in which a reservoir of caustic or alkaline material is stored for addition to the scrub solution tank 144 as the pH level in the tank drops. Variations in the pH of the scrub solution in tank 144 are sensed by well known pH sensors in pH monitor and control unit 190. Signals from unit 190 activate motor 194 which has a single drive mechanism 197 which operates dual pump heads 192 and 193. Pump 192 controls the flow of caustic or alkaline solution from the make-up tank 146 into scrub solution tank 144. Pump 193 controls the flow of blowdown stream from scrub solution tank 144 to the primary chamber 101 of incinerator 10 via conduit 199. A single motor 194 drives both pumps through a single drive mechanism 197 in response to an electrical signal from the pH monitor and control indicating whether the pH in the solution is low or high.

To maintain a constant pH in the solution the caustic or alkaline compound, such as NaOH in the scrubbing solution must be replenished. Each mole of HCl is neutralized by one mole of NaOH producing one mole of NaCl in the scrub solution. Because of corrosion the concentration of NaCl should be minimized. This is accomplished in the present invention by feeding a portion of the scrub solution, called the blowdown stream, back to the incinerator while concurrently adding NaOH to the scrub solution. In a particular application, the ratio of make-up consumed versus blowdown rate is estimated to be about 1 to 4. Therefore, pump 192 is designed to operate at four times the capacity of pump 193 thereby simultaneously removing the blowdown stream to the incinerator at a rate sufficient to maintain a constant salt concentration and also adding make-up caustic in a ratio calculated to maintain the pH of the recycled solution constant.

The blowdown stream from pump 193 and tank 144 is coupled via conduit 199 to an inlet nozzle (not shown) on the primary chamber 101 of CAI 10 where it is introduced into the chamber and moisture evaporated up to the afterburner and out the flue 114. Salts and other combustibles in the solution are reduced to ash and removed in the ash removal system 12 previously described.

This completes the description of a preferred embodiment of the invention. Those skilled in the art may recognize other equivalent embodiments to those described herein; which equivalents are intended to be encompassed by the claims attached hereto.

We claim:

1. Radioactive waste treatment apparatus in which the waste includes a substantial amount of polyvinylchloride (PVC) comprising:
   (a) an incinerator for burning said waste to produce an acidic gas effluent and an ash residue, said incinerator having a primary chamber and an afterburner chamber;
   (b) scrubbing apparatus in fluid communication with said afterburner chamber for washing said gas effluent with scrubbing solution to entrap radioactive particulates in the gas and to neutralize said gas effluent;
   (c) a reservoir in fluid communication with a scrubbing solution container and containing a supply of alkaline for said scrubbing solution;
   (d) a scrubbing solution container in which said alkaline is mixed with said scrubbing solution;
   (e) a first conduit means for coupling said scrubbing solution container to said scrubbing apparatus;
   (f) a second conduit means for coupling scrubbing solution from said scrubbing solution container to the primary chamber of said incinerator where the scrubbing solution is reduced to water vapor and dry residue;
   (g) coupling means for coupling the vapor to the afterburner chamber;
   (h) disposal means coupled to said primary chamber for removing substantially all of the dry residue produced in the radioactive waste treatment process;
   (i) control means for periodically feeding scrubbing solution to the second conduit.

2. The apparatus of claim 1 in which the control means also controls the simultaneous addition of said alkaline to the scrubbing solution while controlling the removal of scrubbing solution in response to a signal proportional to the pH of the solution.

3. The apparatus of claim 2 in which the control means comprises a motor which operates a pair of pumps; the first of said pumps being coupled to said reservoir; the second of said pumps being coupled to said container.

4. The apparatus of claim 3 wherein the control means includes means by which the ratio of amount of alkaline supplied to the scrubbing solution versus the amount of solution removed is maintained constant whereby the amount of scrubbing solution periodically removed is proportional to the amount of acidic gas generated in the incinerator.

* * * * *